(12) United States Patent
Castro

(10) Patent No.: US 11,692,568 B2
(45) Date of Patent: Jul. 4, 2023

(54) FASTENING DEVICE

(71) Applicant: ILLINOIS TOOL WORKS INC., Glenview, IL (US)

(72) Inventor: Dominique Castro, La Rue-Saint-Pierre (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 319 days.

(21) Appl. No.: 17/099,939

(22) Filed: Nov. 17, 2020

(65) Prior Publication Data

US 2021/0164506 A1  Jun. 3, 2021

(30) Foreign Application Priority Data

Nov. 29, 2019 (EP) ..................................... 19212685
Oct. 14, 2020 (EP) ..................................... 20201720

(51) Int. Cl.
  *F16B 5/06* (2006.01)
  *F16B 21/06* (2006.01)
(52) U.S. Cl.
  CPC ............ *F16B 5/065* (2013.01); *F16B 21/065* (2013.01)
(58) Field of Classification Search
  CPC .................................................. F16B 21/065
  See application file for complete search history.

(56) References Cited

U.S. PATENT DOCUMENTS

| 5,894,641 | A  | * | 4/1999 | Hurtz ................. | A44B 17/0011 |
| | | | | | 24/658 |
| 2014/0255089 | A1 | * | 9/2014 | Courtin ..................... | F16B 5/10 |
| | | | | | 403/326 |
| 2015/0354610 | A1 | * | 12/2015 | McClure ................... | F16B 2/12 |
| | | | | | 24/649 |
| 2018/0180083 | A1 | * | 6/2018 | De Marco ........... | B60R 13/0206 |

FOREIGN PATENT DOCUMENTS

WO   WO2016/207531   12/2016

* cited by examiner

*Primary Examiner* — Christopher M Koehler
(74) *Attorney, Agent, or Firm* — Thompson Hine LLP

(57) ABSTRACT

A fastening device includes a male member having a head portion at a proximal end along a first central axis, an impact retention stem protruding from the head portion along the first central axis towards a distal end, and a tooth portion. A female member, having a first cavity, extends along a second central axis to guidingly receive the impact retention stem, a periphery of the female member having a lip portion extending towards the second central axis and adapted to lockably engage with the tooth portion, and a second cavity, extending perpendicular to and intersecting the second central axis. A locking member is configured to be guidingly received by the second cavity and is adapted to retainingly receive the impact retention stem and provide a biasing force along the first central axis towards the head portion in cooperation with the tooth portion when operably engaged with the lip portion.

10 Claims, 12 Drawing Sheets

800

FASTENING DEVICE

TECHNICAL FIELD

The present invention relates to a fastening device. In particular, but not exclusively, the present invention relates to a fastening device for fastening a panel to a wall with a high resistance to pulling off.

INTRODUCTION

It is known that such a device is for example useful in an automotive vehicle, in case of shock, in order for the panel, for example an inside trim panel of a door, to continue being held by the wall, for example the inside sheet metal of the door, at least in certain critical zones, in particular in the deployment zone of an airbag.

Such a device is already known comprising a lining of plastics material which is engaged on a lateral rim of the wall and a screw which is made to engage with an extension of the panel passing in front of the rim of the wall, the screw being engaged in a bore in the lining.

The invention aims to provide a device capable of both, providing a biasing force and locking the individual components together.

For example, US2014/0255089 discloses a fastening devices for fastening a panel to a wall with a high resistance to pulling off. The assembly including a tool capable of insertion between the wall and the panel to reach an actuating part of a female member.

Also, WO2016/207531 discloses a fastening device for joining a first part to a second part. The fastening device including a retaining means in the form of a U-shaped clip which is inserted into a housing of a female element. The U-shaped clip passing transversely through the axial cavity, so as to pinch a male element and lock it in axial position in the cavity of the female element, the retaining means being provided with anti-twist means for the U in the event that the male element is pulled out of the female element.

Consequently, an additional doghouse is required on a car door when using a crash clip as described above in the prior art. One doghouse is required for the crash clip and a further doghouse is needed to input tension of door assembly on to the door.

Accordingly, it is an object of the present invention to provide an improved crash clip overcoming one or more of the disadvantages of the prior art.

SUMMARY OF THE INVENTION

According to a first aspect of the present invention there is provided a fastening device for fastening a panel to a wall, comprising:

a male member, having a head portion provided at a proximal end along a first central axis and an impact retention stem protruding from said head portion along said first central axis towards a distal end, said male member further comprising a tooth portion extending away from said first central axis of said head portion;

a female member, comprising a first cavity, extending in a direction along a second central axis and adapted to guidingly receive said impact retention stem, a periphery of said female member having a lip portion extending towards said second central axis and adapted to lockably engage with said tooth portion, and a second cavity, extending in a direction perpendicular to and intersecting with said second central axis;

a locking member, configured to be guidingly received by said second cavity and adapted to retainingly receive said impact retention stem and provide a biasing force along said first central axis towards said head portion in cooperation with said tooth portion operably engaged with said lip portion, during use.

This provides the advantage of a fastening device that is crash resistant, but also capable of providing tension between a door panel and a door.

Suitably, wherein the locking member may further comprise:

an elastically deformable clamping member, provided substantially centrally along a longitudinal axis and adapted to retainingly receive said impact retention stem, and a release recess, provided adjacent to said clamping member along said longitudinal axis;

wherein said locking member is adapted to slidably move within said second cavity between a locking position, axially aligning said clamping member with said first cavity, and a release position, axially aligning said release recess with said first cavity.

Suitably, said impact retention stem may be adapted to execute a push-force perpendicular to said central axis on said clamping member, during use.

Suitably, said clamping member may be adapted to execute a push-force in a direction parallel to said central axis on said impact retention stem.

Suitably, said impact retention stem may further comprise a tapered surface portion, provided adjacent to said head portion and converging towards said distal end, configured to cooperatingly engage with said clamp member so as to push said clamping member apart when moved towards said first cavity of said female member during use.

Suitably, the fastening device may further comprise a sealing ring adapted to provide a seal between said female member and the wall.

Suitably, said clamping member may comprise two resilient arms arranged in a V-shape configuration and adapted to biasingly move apart.

BRIEF DESCRIPTION OF THE DRAWINGS

Embodiments of the invention are further described hereinafter with reference to the accompanying drawings, in which.

In the drawings like reference numerals refer to like parts.

DETAILED DESCRIPTION OF THE PREFERRED EMBODIMENT(S)

Figure 1A:
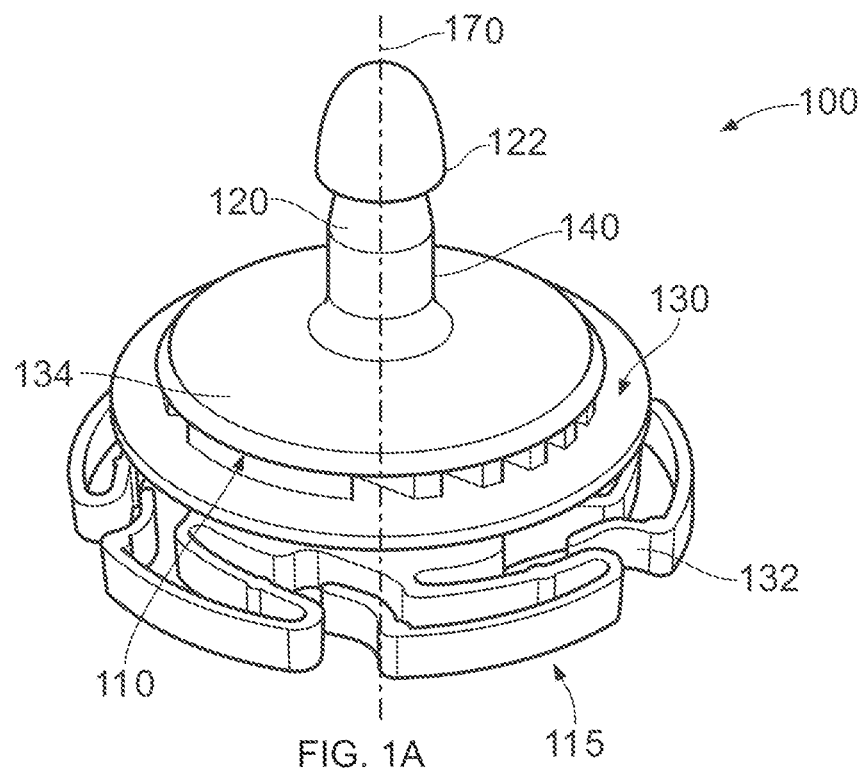
FIGS. 1A-1B illustrate a perspective view of an example of a male member of a fastening device, 1A, a perspective bottom view and 1B, a perspective top view.

In this example, a fastening device 50 is formed of a male member 100, a female member 200 and a locking member 300. Each member will be described in detail below.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner. Like reference numerals are used to depict like features throughout.

Figure 1B:
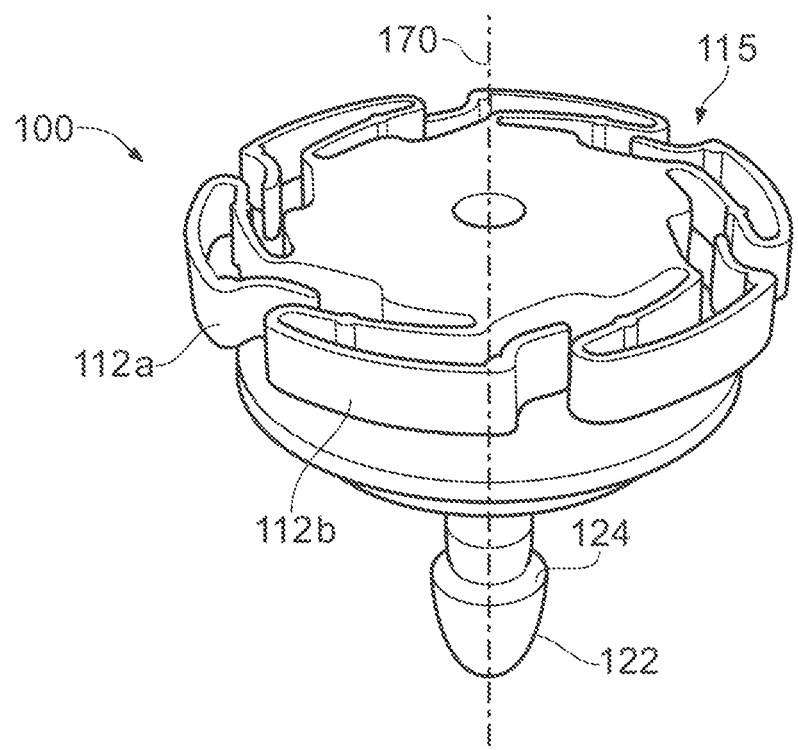

FIGS. 1A and 1B show the male member 100 of the fastening device 50 in different orientations. The male member 100 includes a head portion 110 at a proximal end of the male member. The male member 100 further includes an impact retention stem 120 protruding from the head portion 110 toward a distal end of the male member 100. In this example, the impact retention stem 120 protrudes from the head portion 110 along a central axis 170. That is, the impact retention stem 120 protrudes perpendicularly from the centre point of the longitudinal plane of the head portion 110.

Further, the impact retention stem 120 includes a flared end 122. The flared end 122 is adjacent the distal end of the male member 100. In this example the flared end 122 forms a lip 124 which protrudes from the impact retention stem 120. For example, the impact retention stem 120 may be described as substantially mushroom shaped. However, it is understood by the person skilled in the art, that any other suitable shapes may be used for the flared end 122.

Figure 6:
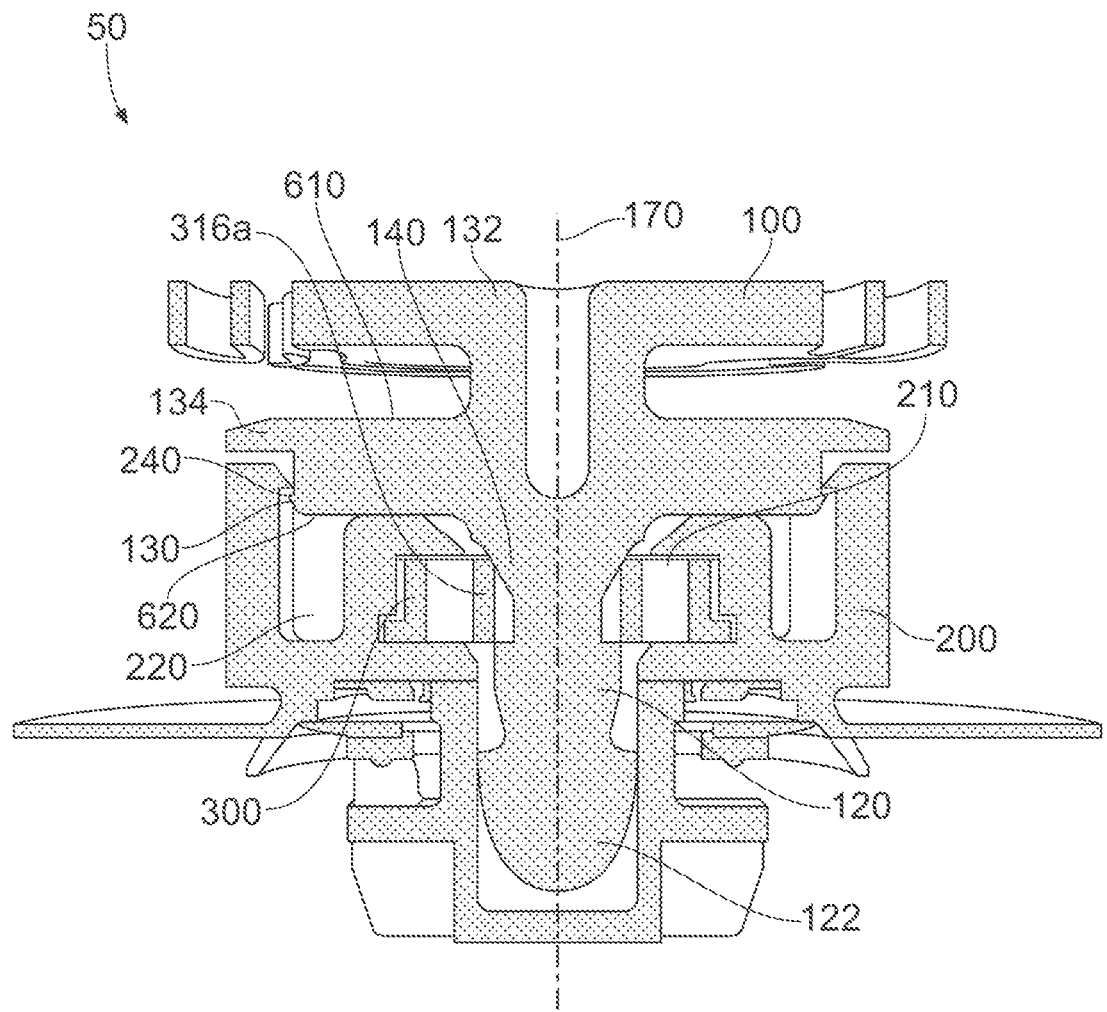
FIG. 6 illustrates a cross sectional view of the assembled fastening device of FIG. 5 when the head portion of the male member is locked into the female member.

The impact retention stem 120 further includes a tapered surface portion 140 (see FIG. 6). The tapered surface portion 140 is provided adjacent to the head portion 120 and converges towards the distal end of the impact retention stem 120. The tapered surface portion 140 may be a conical surface for example.

As shown best in FIG. 6 the head portion 110 may include a first flange 132. The head portion 110 further includes a second flange 134. The second flange 134 is spaced apart from the first flange 132 in a direction toward the distal end of the male member 100. The second flange member is of cylindrical shape having a proximal end 610 and a distal end 620. The proximal end 610 may comprise a stepped portion extending radially outward. The distal end 620 comprises a tooth portion 130 extending radially away from the central axis. The phased front face of the tooth portion 130 faces towards the distal end of the male member 100. The tooth portion 130 extending away from the central axis 170 of the male member. In this example the tooth portion 130 is formed integrally with the second flange 134.

In this particular example the first flange 132 of the head portion 110 includes a self-centring segment 115 disposed opposed the impact retention stem 120. In some example the first flange may be a self-centring segment 115. The self-centring segment 115 may be formed of a plurality of protrusions 112a, 112b. The protrusions 112a may extend laterally from the central axis 170 of the male member 100. In this example the protrusions 112a, 112b extend to form a planar spiral pattern. Other examples may include spoke shaped patterns or any other suitable shape.

Figure 2A:
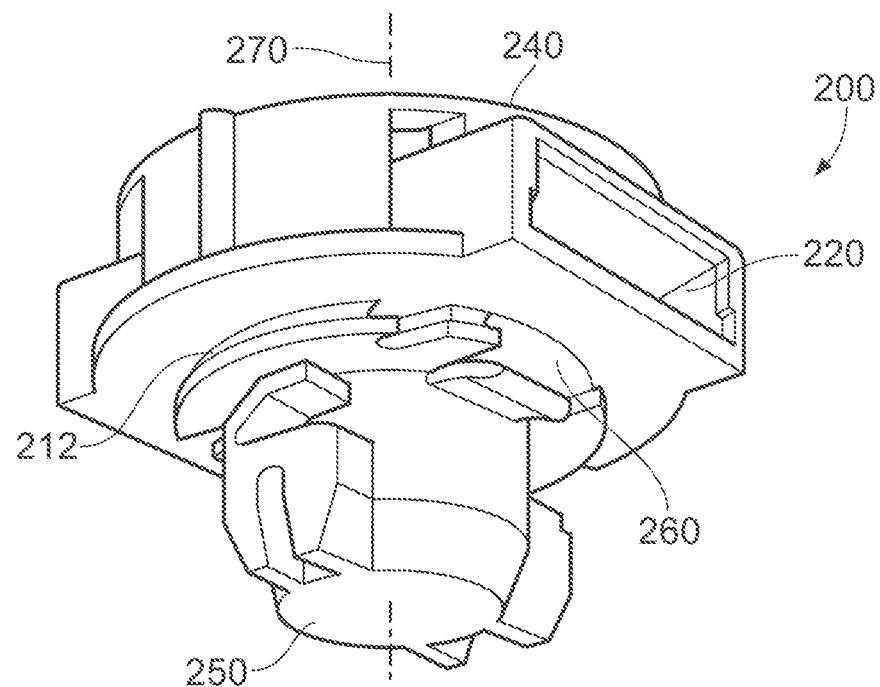
FIGS. 2A-2B illustrate an example of a female member of the fastening device, FIG. 2A being a perspective view and FIG. 2B being a top view.
Figure 2B:
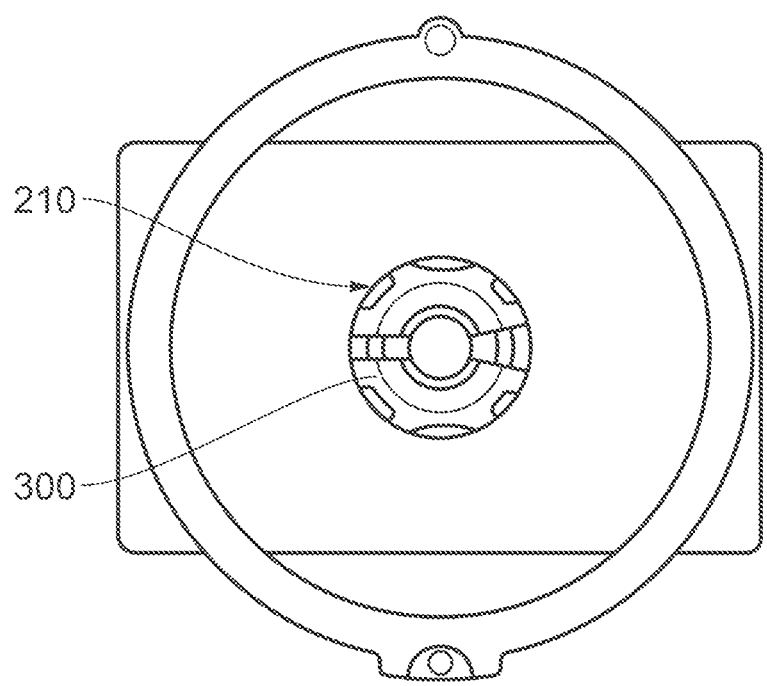

FIGS. 2A and 2B illustrate an example female member 200. The female member 200 is configured so as to receive the male member 100 and the locking member 200. Once assembled together the male member 100 is retained at least partially within in the female member 200 by the locking member 300.

In particular, the female member 200 includes a first cavity 210. The first cavity 210 extends in a direction along a second central axis 270. That is the central axis 170 of the male member 100 is separate and distinct from the central axis 270 of the female member 200. The central axis 270 of the female member 200 runs longitudinally through the centre line of the female member's 200 first cavity 210.

The first cavity 210 extends at least partially through the female member 200. The first cavity 210 is adapted to receive the impact retention stem 120. In this way the first cavity 210 is shaped to at least partially correspond to the shape of the impact retention stem 120. For example, the first cavity 210 may be shaped so as to receive and accommodate the impact retention stem.

The male member 100 is configured to engage with the female member 200. That is, the impact retention stem 120 of the male member 100 is received into the first cavity 210. The first cavity 210 is configured such that the impact retention stem 120 is guidingly received by the female member 200, i.e. the opening of the first cavity 210 may be provided with a phased rim so as to funnel the impact retention stem 120 into the first cavity 210.

The female member 200 further includes a second cavity 220. The second cavity 220 extends in a direction that is perpendicular to, and intersecting with, the central axis 270 of the female member 200. The second cavity 220 defines a receiving area configured to accept the locking member 300. The second cavity 220 is arranged so as to intersect with the first cavity 210. That is, the first and second cavities 210, 220 are spatially linked.

Further, the female member 200 includes a peripheral wall section 212 surrounding at least part of the second cavity 220. The peripheral wall 212 extends from a proximal end of the first cavity 210 and away from the first cavity 210 so as to form a cylindrical recess adapted to receive at least a portion of the male member 100 head portion 110. A lip portion 240 is provided at an inner surface at the rim of the peripheral wall 212 extending from the inner surface of the peripheral wall 212 towards the central axis 270 of the female member 200. Further the lip portion 240 has phased front surface facing towards the proximal end and stepped back surface facing towards the distal end.

In use, the lip portion 240 of the female member 200 lockingly engages with the tooth portion 130 of the male member 100. This will be described in further detail with reference to FIG. 6.

The female member 200 may include a clipping portion 250. The clipping portion 250 is situated at the distal end of the female member 200 and is adapted to attachingly couple with a suitable recess of the panel (e.g. a ¼ turn fastener mechanism). The clipping portion 250 further includes adjustable tabs 260 configured to allow the fastening device 50 to accommodate various wall thicknesses.

Figure 3A:
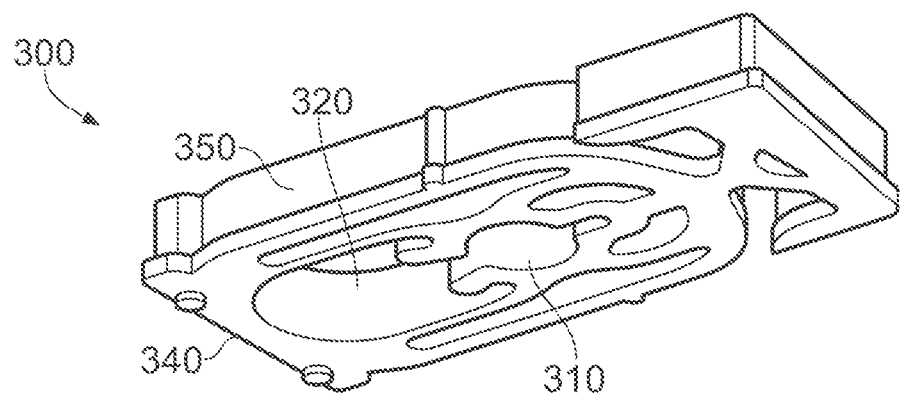
FIGS. 3A-3B illustrate an example of a locking member of the fastening device, FIG. 3A being a perspective view and FIG. 3B being a plan view.
Figure 3B:
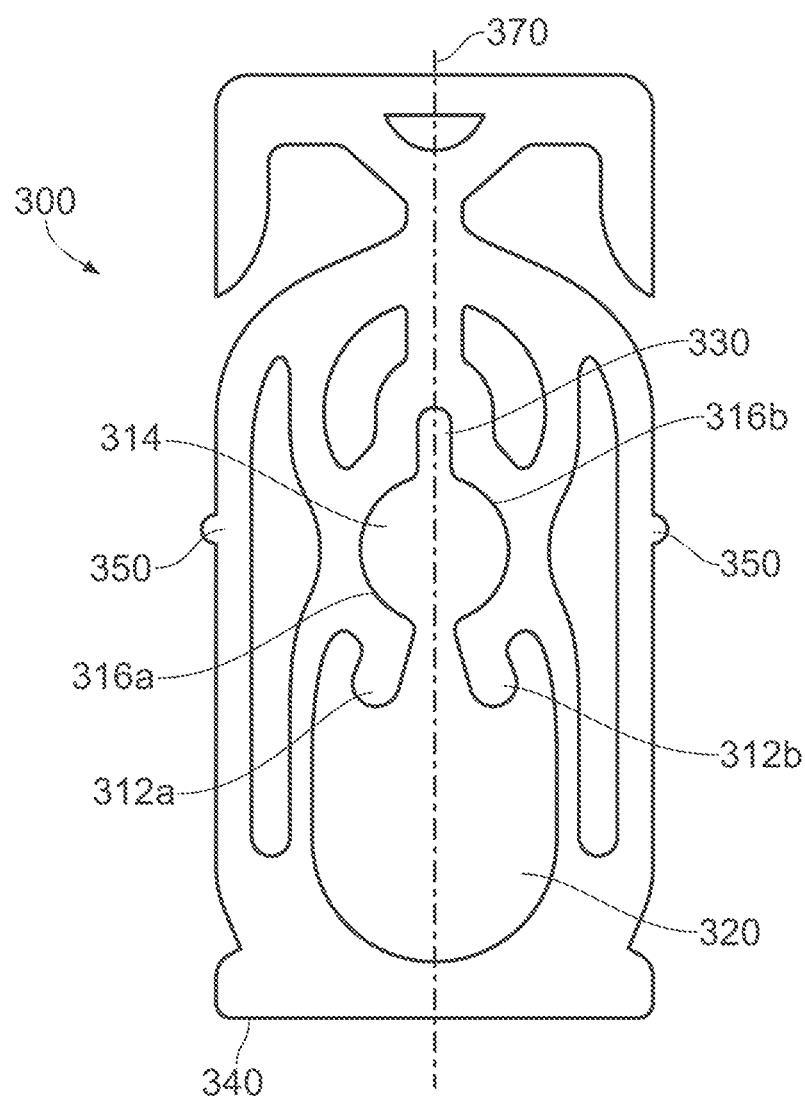

Referring now to FIGS. 3A and 3B, an example embodiment of the locking member 300 is shown. The locking member 300 is configured to be guidingly received by the second cavity 220. In other words, the shape of the locking member 300 is complementary to the second cavity 220 of the female portion 200, so that the locking member 300 can be inserted into the second cavity 220 and longitudinally move therein. The locking member 300 is adapted to be slidingly moved within the second cavity between a locking position and a releasing position. The locking position being the position where the male member 100 is retained in position within the first cavity 210 of the female member 200.

The locking member 300 is shaped so as to retainingly receive the impact retention stem 120 of the male member 100. The locking member 300 is configured to cooperate with the impact retention stem 120 so as to provide a biasing force towards the proximal end of the impact retention stem 120. In this way the locking member 300 provides a biasing force along the central axis 170 towards the head portion 110 of the male member 100.

In particular, the locking member 300 comprises an elastically deformable clamping member 310. The clamping member 310 includes a holding recess 314. The holding recess 314 is shaped so as to receive and retain the impact retention stem 120 therein. The holding recess 314 is sized such that the flared end 122 of the impact retention stem 120 cannot move through. Lateral movement of the male member 100 is prevented by the lip 124 of the flared end 122 abutting the walls 316a, 316b of the clamping member 310 when the locking member 300 is in the locked position.

The clamping member 310 is substantially central along a longitudinal axis 370 on the locking member 300. In this way, the clamping member 310 is provided under the first cavity 210 of the female member when in normal use (locking position).

The flared end 122 of the impact retention stem 120 may push the clamping member 310 apart when moved towards the first cavity 210 of the female member 200.

In use, the tapered surface portion 140 of the impact retention stem 120 executes a push-force that translates into a force onto the lateral arms of the clamping member 310. This force translate from the tapered surface is acting in a direction perpendicular to the central axis 170 of the male member 100. The counteracting biasing force provided by the resilient clamping member 310 acts to keep the fastening device 50 under tension when lip portion 240 and tooth portion 130 are in locking engagement.

The holding recess 314 may include a protrusion 330 at the head of the clamping member 310. This protrusion allows the clamping member 310 to elastically stretch to accommodate the impact retention stem 120. Therefore, the protrusion 330 forms an anti-loss mechanism.

The locking member 300 includes a release recess 320. The release recess 320 is adjacent the clamping member 310 along its longitudinal axis 370. The release recess 320 is sized to be substantially larger than the flared end 122 of the impact retention stem 120 so as to allow movement therethrough. In use, when the release recess 320 is moved to the impact retention stem 120, the male member 100 may be moved out of the first cavity 210 of the female member 200.

The clamping member 310 may comprise resilient arms 312a, 312b. The resilient arms 312a, 312b may be in a V-shaped configuration, so as to form a conduit 322 between the holding recess 314 and the release recess 320 along the longitudinal axis 370. The conduit 322 tapers toward the protrusion 330, so as to provide a tight clamp when in a locking position. The resilient arms 312a, 312b are adapted to biasingly move apart when the impact retention stem 120 pushes through. The resilient arms 312a, 312b may be elastically linked with the frame of the locking member 300.

As discussed above, the locking member 300 is slidable within the second cavity 220 of the female member 200 between a locking position and a release position. In the locking position, the holding recess 314 is axially aligned with the first cavity 210 of the female member 200 and the impact retention stem 120 is retained by the clamping member 310.

In order to remove the male member 100 from the female member 200, an external push force is provided on an abutment wall 340 of the locking member 300 to slide the locking member 300 longitudinally such that the impact retention stem 120 passes through the cavity 322 and into the release recess 320. In the releasing position the release recess 320 is axially aligned with the first cavity 210 of the female member 200. The impact retention stem 120 may therefore be released from the locking member 300, and then the female member 200.

The locking member 300 may optionally include retention protrusions 350 on the outer periphery of the locking member 300. The retention protrusions 350 are configured to abuttingly engage with a step portion of the second cavity 220 of the female member 200 forming an anti-loss system.

Figure 4:
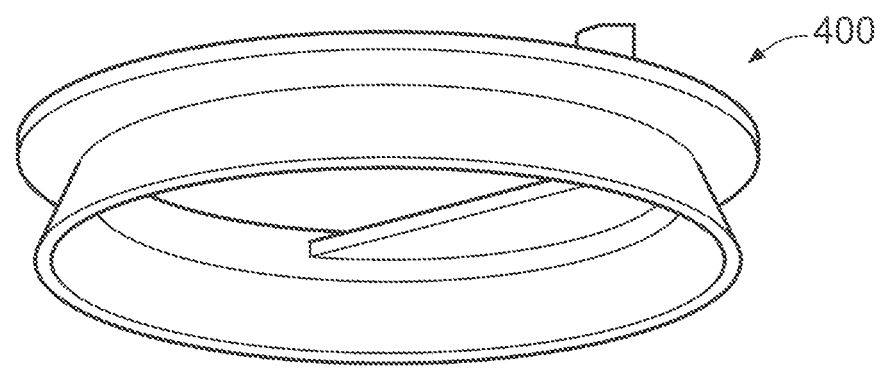
FIG. 4 illustrates a perspective view of an example of a sealing ring for the fastening device.

FIG. 4 illustrates a sealing ring 400. The sealing ring 400 may be fitted to the exterior of the female member 200, so as to allow a tight seal between the fastening device 50, panel and wall when in use. The sealing ring 400 may be shaped so as to clip on to a bottom portion of the female member 200.

Figure 5:
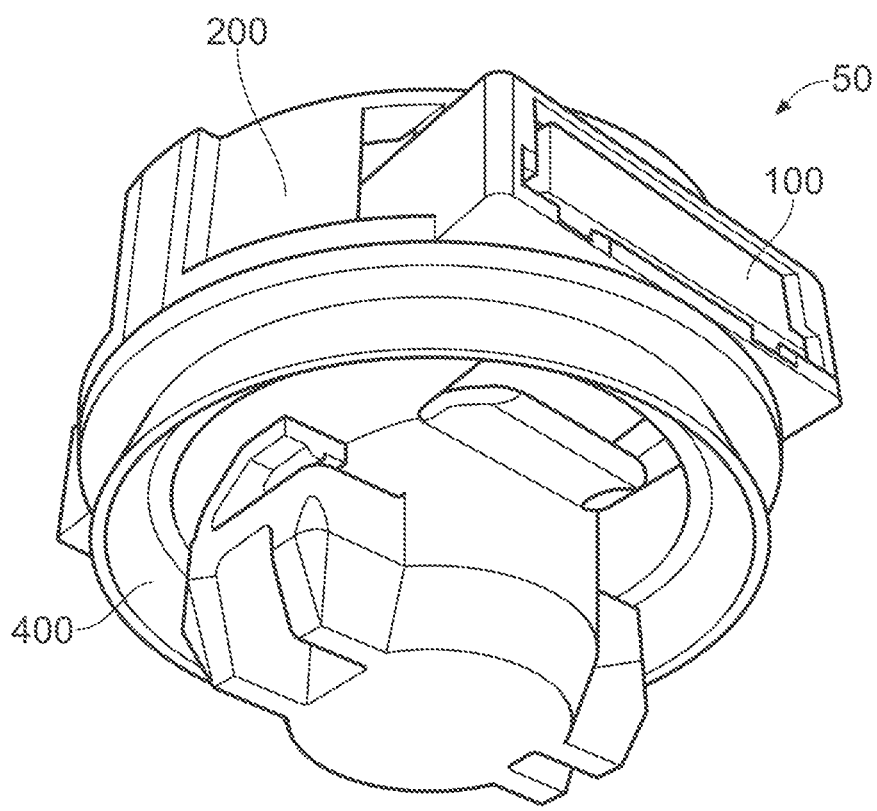
FIG. 5 illustrates a perspective bottom view of an example of an assembled fastening device.
Figure 7:
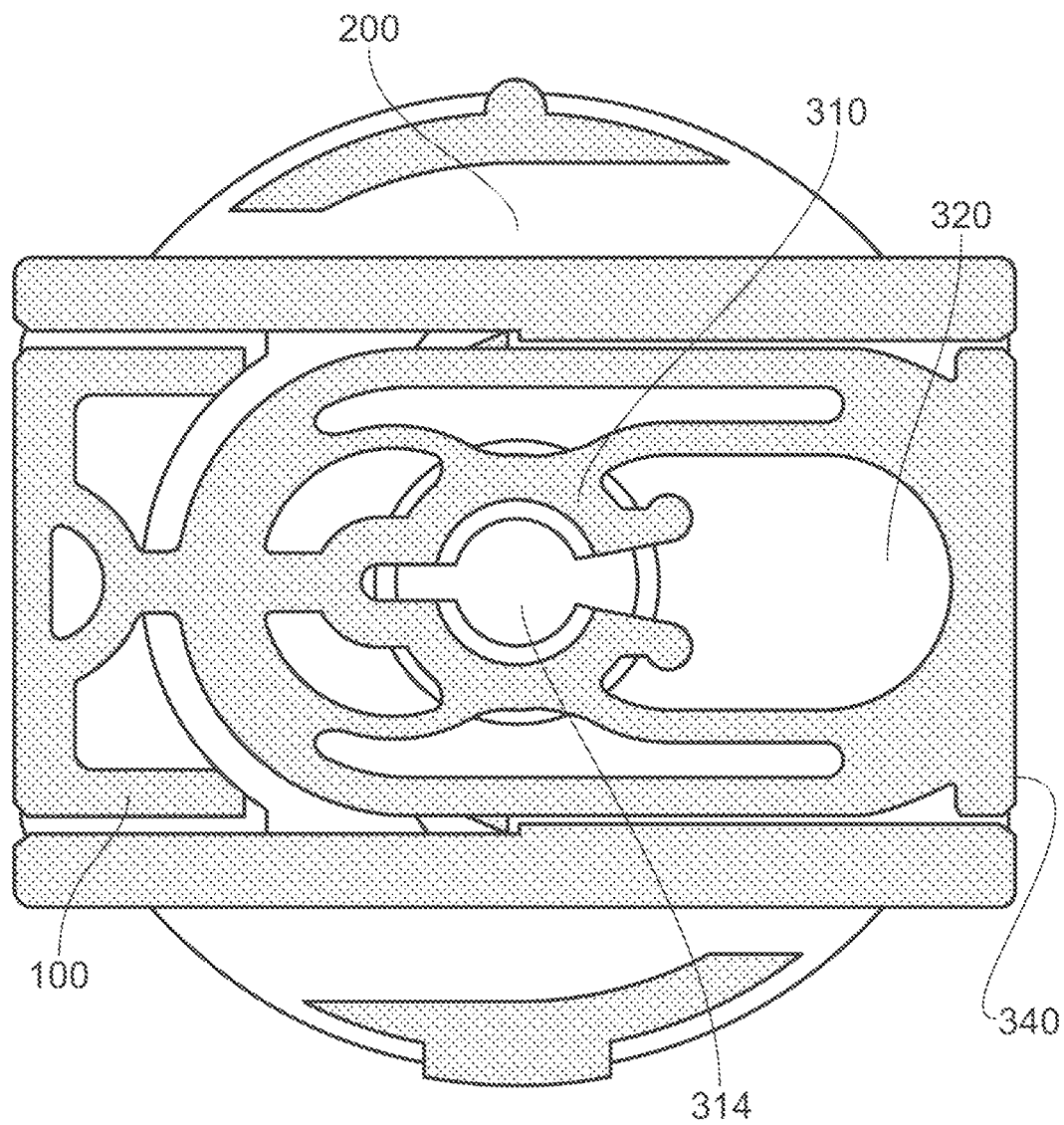
FIG. 7 illustrates a cross sectional plan view of the locking member within the female member.

FIG. 5 illustrates the fastening device 50 in an assembled configuration. FIG. 6 illustrates a lateral cross-sectional view of the fastening device 50 of FIG. 5. FIG. 7 shows a longitudinal cross-sectional view of a locking member 300 within a female member 200.

As shown in FIG. 6, the lip portion 240 of the female member 200 engages with the tooth portion 130 of the male member 100. In this way, the female member 200 lockingly engages with the male member 100. Further, the biasing force provided by the locking member 300 engaging with the tapered surface portion 140 of the impact retention stem 120 creates a tension between the male member 100 and the female member 200.

The male member 100 is further configured to attach to a door panel and the female member 200 is configured to attach to the door assembly (e.g. via the ¼ turn clipping portion 250). In this way the fastening device 50 provides a tensioned coupling between the door panel and door assembly.

Referring now to FIGS. 8 to 13, a different, alternative, example embodiment of the fastening device 500 of the present invention is shown. As with the previous example embodiment of the fastening device 50, the assembly comprises a male member 600, a female member 700, a locking member 800 and a sealing member 900. Each one of the component parts 600, 700, 800 and 900 is similar and functionally likewise to its equivalent component part (i.e. 100, 200, 300, 400) of the previous example embodiment (see FIGS. 1 to 7) and only relevant structural differences between the two example embodiments of the fastening device 50 and 500 will be described in more detail.

Figure 8A:
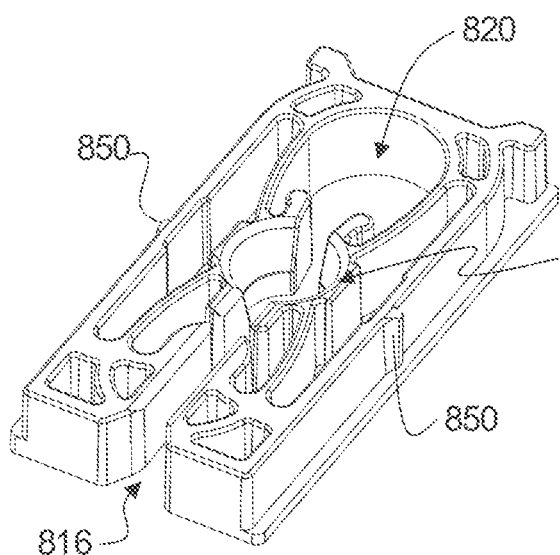
FIGS. 8A-8C illustrate an example embodiment of an alternative locking member of an alternative fastening device, FIG. 8A in a perspective top view, FIG. 8B in a perspective bottom view and FIG. 8C in a top view.
Figure 8B:
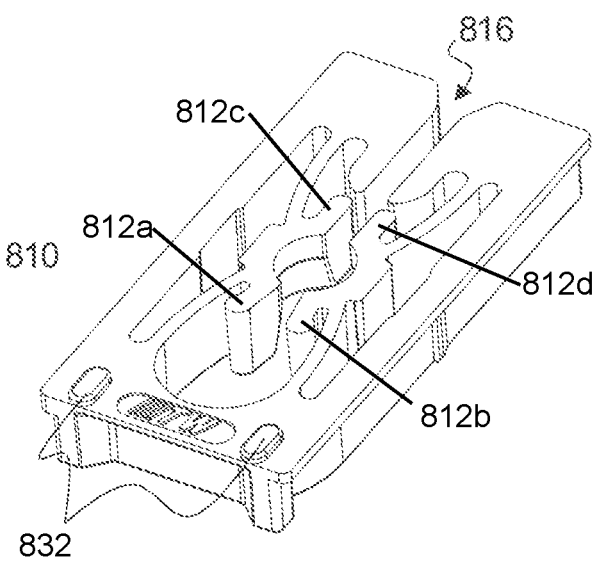
Figure 8C:
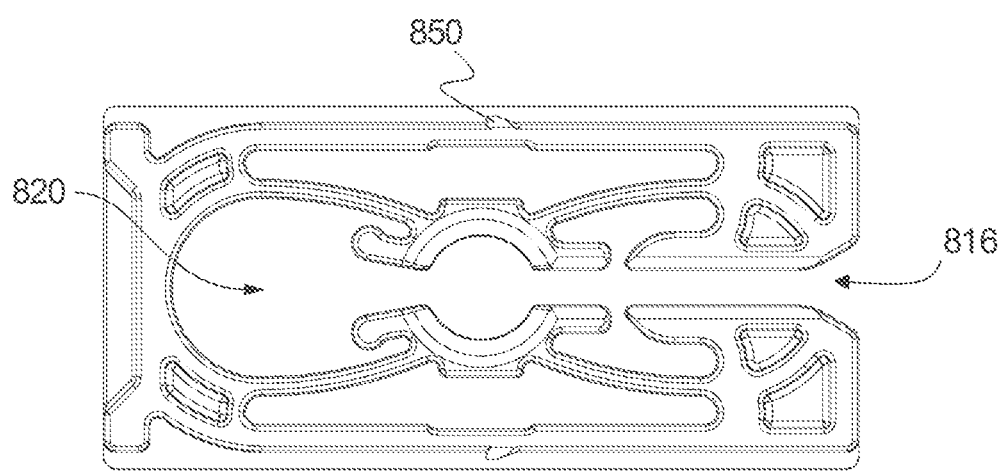
Figure 9A:
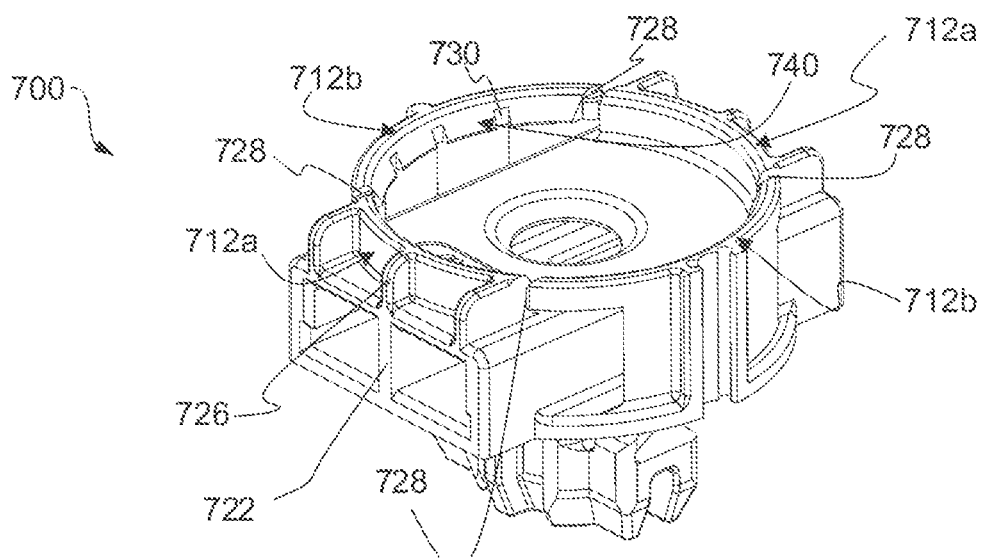
FIGS. 9A-9E illustrate an example embodiment of an alternative female member of the alternative fastening device, FIG. 9A in a perspective top view, FIG. 9B a top view, FIG. 9C a side view, FIG. 9D a front view, and FIG. 9E a perspective cross sectional top view along A-A.
Figure 9B:
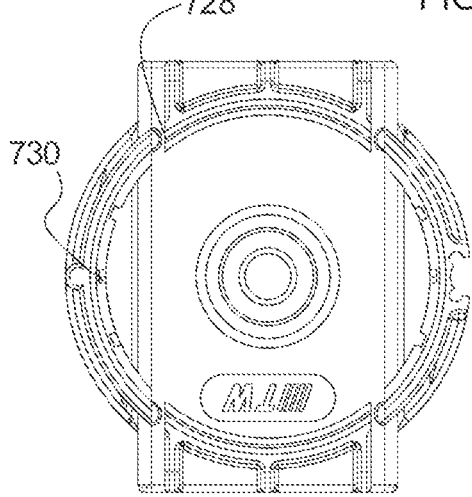
Figure 9C:
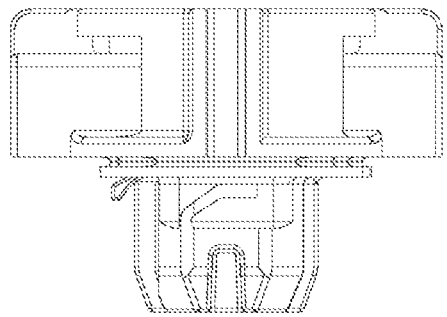
Figure 9D:
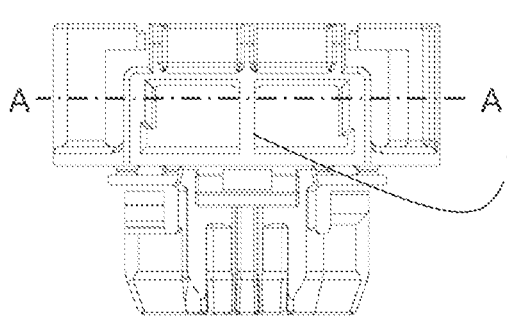
Figure 9E:
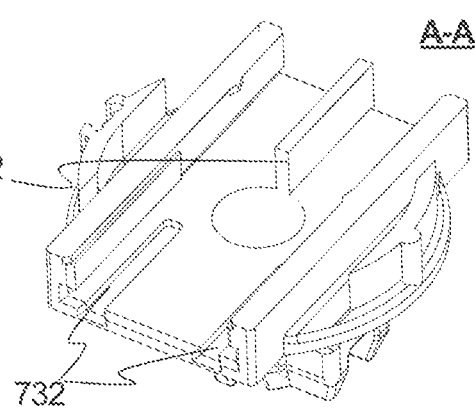

Referring to FIGS. 8A and 8B, the alternative locking member 800 comprises an elastically deformable clamping member 810 having two pairs of resilient arms 812a, 812b and 812c, 812d. The clamping member 310 defines a holding recess 814 that is shaped so as to receive and retain the impact retention stem 620 of the male member 600 during assembly. Further a passage 816 is formed so as to cooperatingly engage with a partial central wall 722 within the second cavity 720 of the female member 700, i.e. so as to allow predetermined longitudinal sliding movement of the locking member 800 within the second cavity 720 of the female member 700. Retention protrusions 850 (e.g. retention tines) are provided on the outer wall of the locking member 800 adapted to lockingly engage with a respective shoulder portion 724 within the second cavity 720 of the female member 700, so as to limit the longitudinal sliding movement of the locking member 800 within the second cavity 720 of the female member 700 and, together with the central wall 722, confine the locking member 800 within the second cavity 720 of the female member, once assembled. Further, two protrusion 832 are provided on the bottom surface of the proximal end of the locking member 800 configured to slidingly engage with respective recesses 732 in the second cavity 720 of the female member 700 so as to limit the longitudinal movement of the locking member 800 within the second cavity 720 of the female member 700.

Referring now to FIGS. 9A-9D, the alternative female member 700 further comprises a peripheral wall section 712 that is divided into four wall sections, two opposing longitudinally arranged first wall sections 712a and two opposing laterally arranged second wall sections 712b. The opposing first wall sections 712a are separated from the opposing lateral wall section 712b by respective apertures 728. Additional spaced apart recesses 730 are provided on the inner lip 740 of the second wall sections 712b. Both, respective apertures 728 between first and second wall sections 712a, 712b and recesses 730 on the inner lip 740 are configured to reduce the extraction force between the male member 600 and the female member 700. Each one of the first wall sections 712a may comprise a plurality of spaced apart ribs 726 adapted to structurally strengthen the first wall section 712a.

Figure 10A:
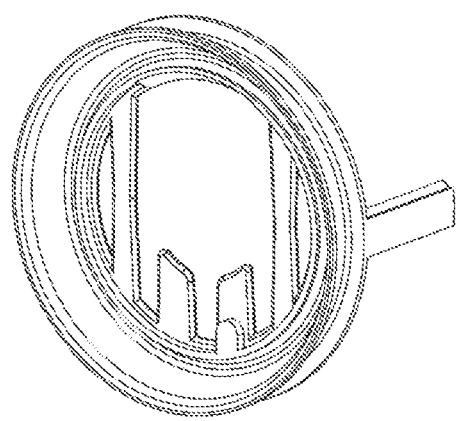
FIGS. 10A-10-C illustrate an example embodiment of an alternative sealing ring of the alternative fastening device FIG. 10A in a perspective front view, FIG. 10B perspective rear view, and FIG. 10C a side view.
Figure 10B:
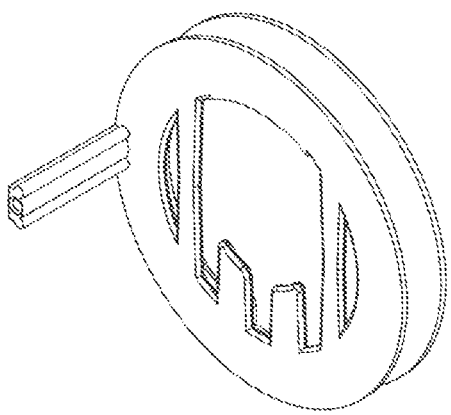
Figure 10C:
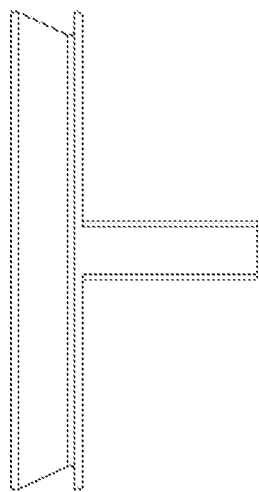

FIGS. 10A-10C show an example embodiment of the alternative sealing member 900 adapted to couplingly engage with the female member 200.

Figure 11A:
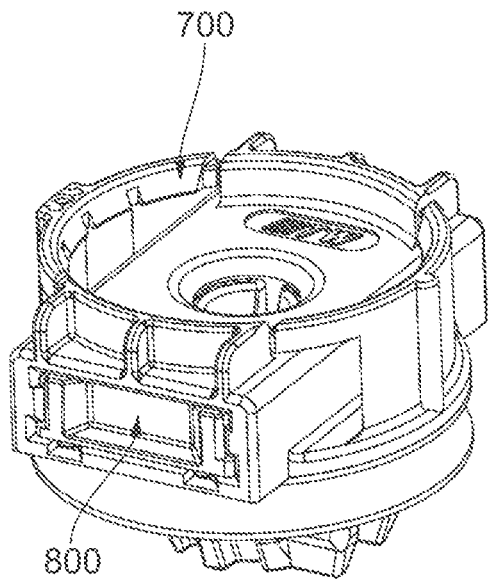
FIGS. 11A-11C illustrate the assembled alternative female member and the alternative locking member of FIGS. 8 and 9, FIG. 11A in a perspective front view, FIG. 11B in a perspective rear view, and FIG. 11C in a cross-sectional plan view.
Figure 11B:
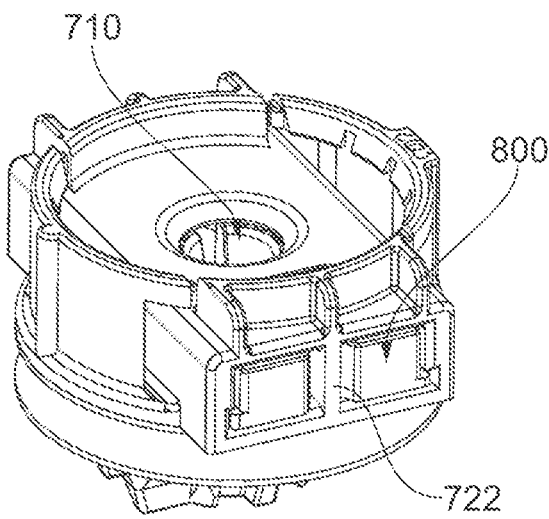
Figure 11C:
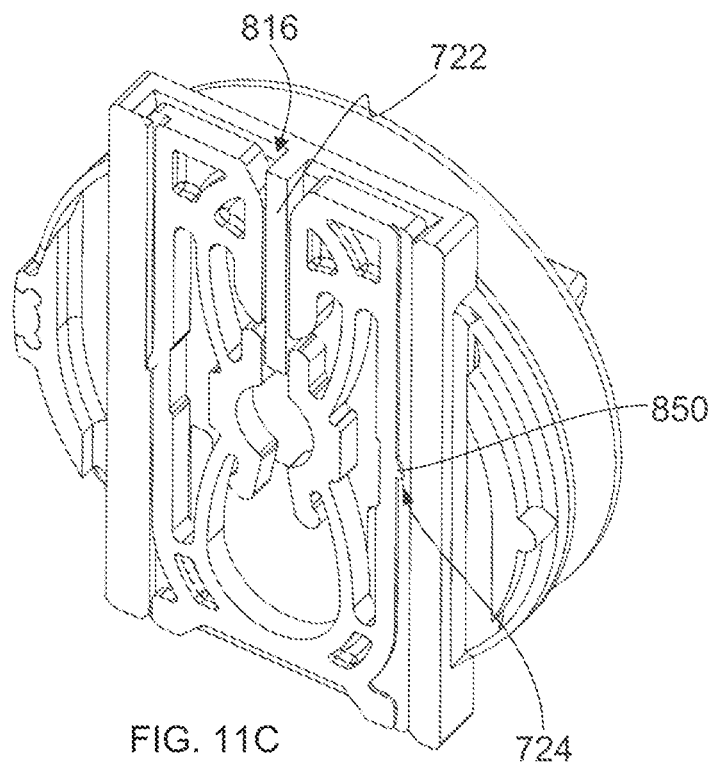

FIGS. 11A-11B show a perspective front and rear view of an assembled female member 700, locking member 800 and sealing member (i.e. without the male member 600) with the locking member 800 full inserted into the second cavity 720 of the female member 700. FIG. 11C provides and "inside" view into the second cavity 720 with the inserted locking member via a planar sectional view (along the longitudinal axis of the second cavity 720 and normal to the central axis of the first cavity 710) of the second cavity 720 of the female member 700 and inserted locking member 800. In particular, the sectional view clearly shows the engagement between the retention protrusions (or tines) 850 of the locking member 800 and the shoulder portion 724 inside the second cavity 720 of the female member 700, as well as, the arrangement between the partial central wall 722 of the second cavity 720 and the passage 816 of the locking member 800.

Figure 12A:
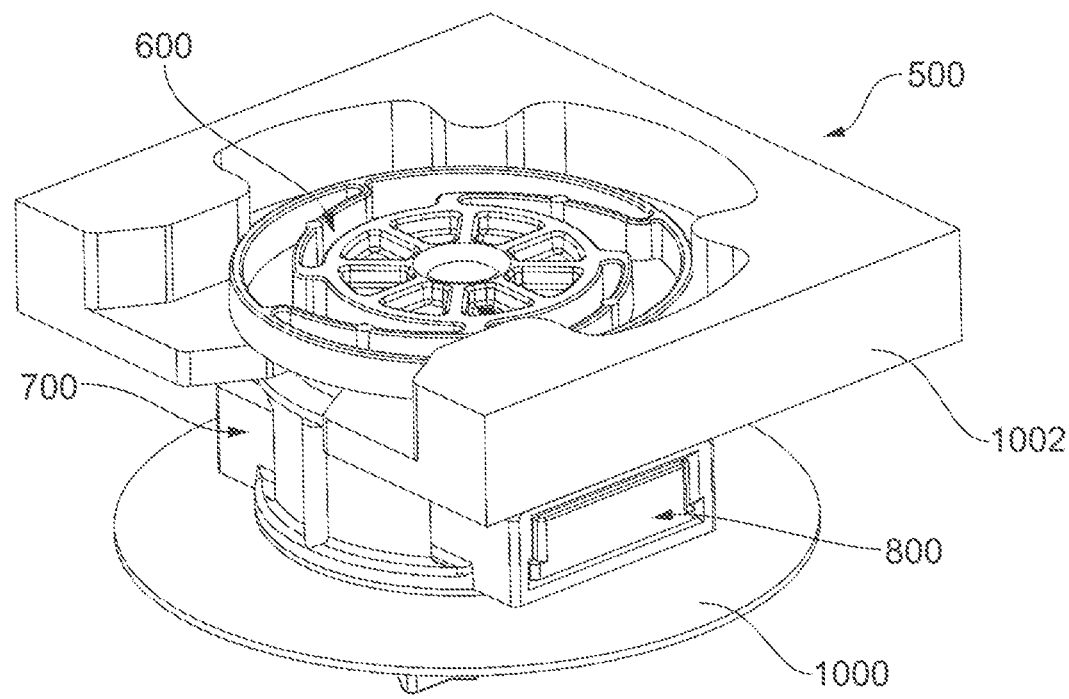
FIGS. 12A-12B illustrate the assembled fastening device, in situ, FIG. 12A in a perspective view and FIG. 12B in a cross-sectional side view.
Figure 12B:
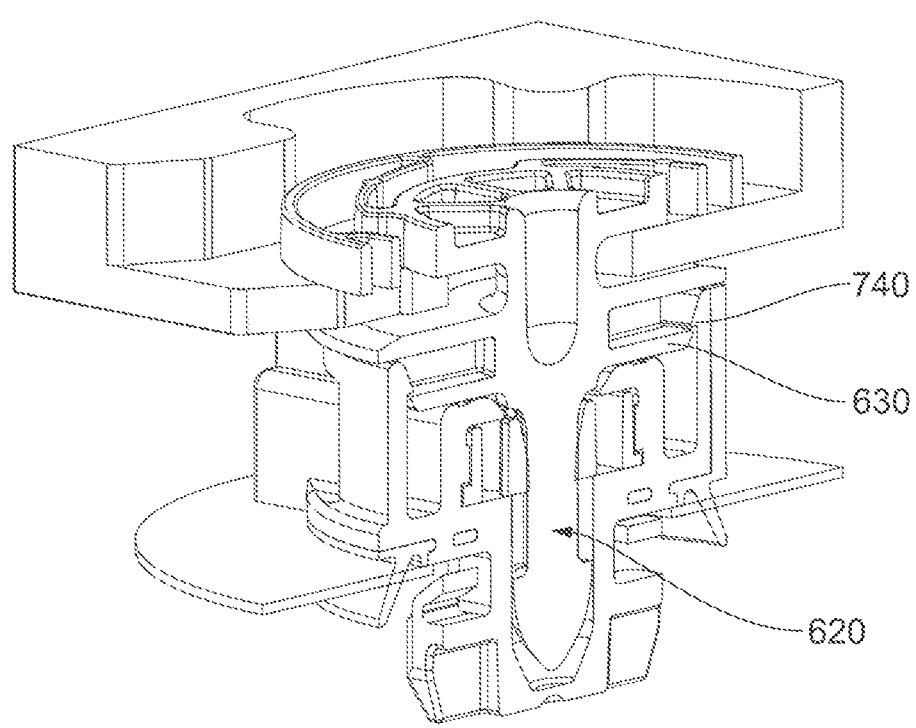

Referring now to FIGS. 12A-12B, the example embodiment of the alternative fastening device 500 is shown, in situ, i.e. fully assembled and coupled to component structures 1000 and 1002.

Here, the female member 700 is lockingly coupled through an aperture of a first component structure 1000, wherein the male member 600 is inserted through the first cavity 710 and lockingly engaged with the inserted locking member 800. The head portion of the male member 800 is coupled to the second component structure 1002, wherein the tooth portion 630 of the male member 800 is lockingly engaged with the inner lip 740 of the second wall sections 712b.

Figure 13:
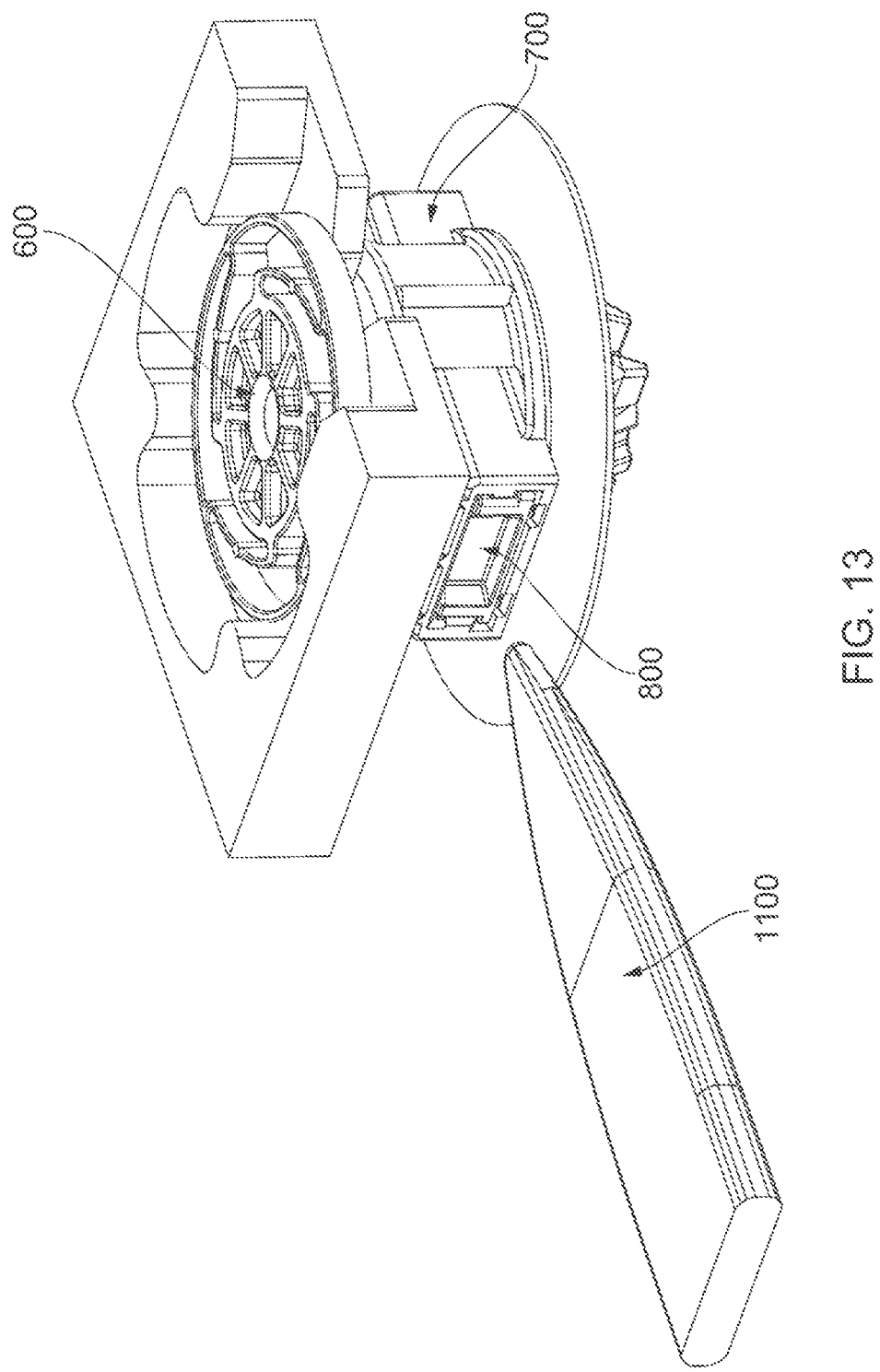
FIG. 13 illustrates a perspective view of the assembled fastening device and a suitable tool.

FIG. 13 illustrates the use of a tool 1100 when applied to the proximal end of the locking member 800 so as to push the locking member 800 into the second cavity 720 and axially align the release recess 820 with the impact retention stem 620 of the male member 600, allowing the male member to be removed from the female member 700.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A fastening device for fastening a panel to a wall, comprising:
    a male member, having a head portion provided at a proximal end along a first central axis and an impact retention stem protruding from said head portion along said first central axis towards a distal end, said male member further comprising at least one tooth portion extending away from said first central axis at said head portion;
    a female member, comprising a first cavity, extending in a direction along a second central axis and configured to guidingly receive said impact retention stem, a periphery of said female member having at least one lip portion extending towards said second central axis and configured to lockably engage with said tooth portion, and a second cavity, extending in a direction perpendicular to and intersecting with said second central axis;
    a locking member, configured to be guidingly received by said second cavity and configured to retainingly receive said impact retention stem and provide a biasing force along said first central axis towards said head portion in cooperation with said tooth portion when operably engaged with said lip portion.

2. A fastening device according to claim 1, wherein the locking member further comprises:
    an elastically deformable clamping member, provided substantially centrally along a longitudinal axis and configured to retainingly receive said impact retention stem, and a release recess, provided adjacent to said clamping member along said longitudinal axis;
    wherein said locking member is configured to slidably move within said second cavity between a locking position, axially aligning said clamping member with said first cavity, and a release position, axially aligning said release recess with said first cavity.

3. A fastening device as claimed in claim 2, wherein said impact retention stem is configured to execute a push-force perpendicular to said central axis on said clamping member, during use.

4. A fastening device as claimed in claim 3, wherein said clamping member is configured to execute a push-force in a direction parallel to said central axis on said impact retention stem.

5. A fastening device according to claim 1, wherein said impact retention stem further comprises a tapered surface portion, provided adjacent to said head portion and converging towards said distal end, configured to cooperatingly engage with said clamp member so as to push said clamping member apart when moved towards said first cavity of said female member during use.

6. A fastening device as claimed in claim 1, wherein the fastening device further comprises a sealing ring configured to provide a seal between said female member and the wall.

7. A fastening device as claimed in claim 1, wherein said clamping member comprises at least two resilient arms arranged in a V-shape configuration and configured to biasingly move apart.

8. A fastening device as claimed in claim 7, wherein said clamping member comprises a first pair of resilient arms coupled to a proximal end portion of said locking member and a second pair of resilient arms coupled to a distal end portion of said locking member, each pair of resilient arms configured to biasingly move apart.

9. A fastening device as claimed in claim 1, wherein said locking member comprises a central passage arranged along a longitudinal axis of sad locking member and configured to operably engage with a partial central wall structure provided within said second cavity of said female member.

10. A fastening device for fastening a panel to a wall, comprising:
    a male member, having a head portion provided at a proximal end along a first central axis and an impact retention stem protruding from said head portion along said first central axis towards a distal end, said male member further comprising at least one tooth portion extending away from said first central axis at said head portion;
    a female member, comprising a first cavity, extending in a direction along a second central axis and configured to guidingly receive said impact retention stem, a periphery of said female member having at least one lip portion extending towards said second central axis and configured to lockably engage with said tooth portion, and a second cavity, extending in a direction perpendicular to and intersecting with said second central axis;
    a locking member, configured to be guidingly received by said second cavity and configured to retainingly receive said impact retention stem;
    wherein the head portion includes a flange and the at least one tooth portion is integral with the flange.

* * * * *